(12) United States Patent
Sundararajan et al.

(10) Patent No.: US 11,976,391 B2
(45) Date of Patent: May 7, 2024

(54) MANAGING A MANUFACTURING PROCESS BASED ON HEURISTIC DETERMINATION OF PREDICTED DAMAGES

(71) Applicant: International Business Machines Corporation, Armonk, NY (US)

(72) Inventors: Mukundan Sundararajan, Bangalore (IN); Jignesh K Karia, Thane (IN); Ravindranath Nemani, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 17/499,965

(22) Filed: Oct. 13, 2021

(65) Prior Publication Data

US 2023/0112379 A1  Apr. 13, 2023

(51) Int. Cl.
| | |
|---|---|
| D03J 1/00 | (2006.01) |
| D06H 3/12 | (2006.01) |
| G05B 23/02 | (2006.01) |

(52) U.S. Cl.
CPC .............. *D03J 1/007* (2013.01); *D06H 3/12* (2013.01); *G05B 23/0235* (2013.01); *G05B 23/0294* (2013.01); *G05B 2219/45192* (2013.01)

(58) Field of Classification Search
CPC .. D03J 1/004; D03J 1/005; D03J 1/006; D03J 1/007; D06H 3/12; D06H 3/125;

(Continued)

(56) References Cited

U.S. PATENT DOCUMENTS

| | | | | |
|---|---|---|---|---|
| 4,861,419 A | * | 8/1989 | Flinchbaugh | ..... H01J 37/32935 216/60 |
| 5,815,198 A | * | 9/1998 | Vachtsevanos | ......... G06T 7/001 348/125 |

(Continued)

FOREIGN PATENT DOCUMENTS

| | | |
|---|---|---|
| WO | 2020092509 A1 | 5/2020 |
| WO | 2020/212857 A1 | 10/2020 |

OTHER PUBLICATIONS

International Search Report dated Jan. 2, 2023 received in PCT/EP2022/076454, 14 pages.

(Continued)

*Primary Examiner* — Danny Worrell
(74) *Attorney, Agent, or Firm* — Scully, Scott, Murphy & Presser, P.C.; Michael A. Petrocelli

(57) ABSTRACT

A method, system and computer program product for a heuristic determination of in-process damage class control to manage expected output product category. The heuristic technique determines the predicted damages and their ranges while keeping the initial expected defects, the respective classes and range of defect and mitigation. The method dynamically computes a damage mitigation range of operation while being within the overall constraints and completes the computation in smaller number of loops being run at the edge computers so that the manufacturing equipment can operate at a higher velocity for higher quality of the output. The method includes a step of reducing error of the co-efficient and damage counts. An Internet of Things (IoT) based robot is used to mitigate the damages in the manufacturing steps to ensure that the output class of the product remains what was expected at the start despite damages and mitigation measures.

20 Claims, 9 Drawing Sheets

(58) Field of Classification Search
CPC ...... G05B 2219/45192; G05B 23/0294; G05B 23/0235
See application file for complete search history.

(56) References Cited

U.S. PATENT DOCUMENTS

| | | | |
|---|---|---|---|
| 9,499,926 B2 | 11/2016 | Cohen | |
| 10,119,210 B1* | 11/2018 | Lai | D03J 1/007 |
| 2001/0012381 A1* | 8/2001 | Sari-Sarraf | G06T 7/001 |
| | | | 382/111 |
| 2014/0036061 A1* | 2/2014 | Cohen | D03J 1/007 |
| | | | 348/92 |
| 2016/0177481 A1* | 6/2016 | Wolf | H04N 23/66 |
| | | | 700/140 |
| 2020/0385899 A1* | 12/2020 | Cohen | D03D 49/00 |
| 2021/0238781 A1* | 8/2021 | Cohen | D06H 3/125 |
| 2022/0170189 A1* | 6/2022 | Mandruzzato | D03J 1/007 |
| 2022/0341069 A1* | 10/2022 | Cohen | G06T 7/0004 |
| 2023/0112379 A1* | 4/2023 | Sundararajan | D06H 3/12 |
| | | | 700/144 |
| 2023/0186454 A1* | 6/2023 | Williams | G06T 7/0004 |
| | | | 382/141 |

OTHER PUBLICATIONS

AdvanTech, "AI Defect Inspection for Textile", Oct. 19, 2019, pp. 1-5, https://www.advantech.com/resources/case-study/ai-defect-inspection-for-textile.

Faruk, Omar, "Fabric Inspection/Four Point System", Apr. 2018, pp. 2-16, Textile Study Center, https://textilestudycenter.com/fabric-inspection/.

Jana, Prabir, "Camera Based Visual Fabric Inspection", Apparel Resources, Feb. 1, 2013, pp. 1-8, https://apparelresources.com/technology-news/manufacturing-tech/technology-levels-for-fabric-inspection/.

Worku, Biruk Gedif, "Causes of Woven Fabric Defects and Cost Analysis: Case Study at Bahir Dar Textile Share Company (BDTSC)", Jan. 8, 2021, pp. 1-8, https://www.researchgate.net/publication/348705855.

* cited by examiner

| Length of Defect | Penalty Points Allotted |
|---|---|
| Up to 3 inches | 1 Point |
| 3 - 6 inches | 2 Points |
| 6 - 9 inches | 3 Points |
| Over 9 inches | 4 Points |
| Holes and Openings (1 inch or less) | 2 Points |
| Holes and Openings (over 1 inch) | 4 Points |

MANAGING A MANUFACTURING PROCESS BASED ON HEURISTIC DETERMINATION OF PREDICTED DAMAGES

BACKGROUND

The present disclosure relates generally to computer systems and methods, and more particularly, to a computer system and a computer-implemented heuristic method to determine predicted damages of products while being manufactured and their ranges while keeping the initial expected defects, the respective classification, range of defects and mitigation.

In any continuous process, different types of defects will occur as no manufacturing process is perfect due to the various practical issues that may arise during the manufacturing period. This is exemplified in the domain of manufacturing textiles, e.g., a case of weaving of clothing material. For example, a cloth spinning and weaving company has a similar set of problems with any of the set of defects occurring in the cloth weaving process and can result in various categories (e.g., class 1, class 2 types) of rejects of material classification during inspection by the buyers who use this cloth as the input in their final dress making process. While all buyers would like to buy class 1 type materials, there may be conditions where class 2 material may also be acceptable.

In the prior instances, the manufacturer would have supplied multiple orders where the different defect counts across the different categories would have totaled to the limit for the class and successful sales made for varying lengths of the fabric, but all these are after the fact when the fabric is fully woven and then cut to the needs of the buyers. With improvements in the weaving technology and new combinations of colors and patterns, cloth spinning and weaving mills may now manufacture only to the actual specified lengths with extra length for some issues, but if in some given length there are more defects, the entire length may move to a lower class. These mills try to avoid this to a large extent.

The prior art includes various fabric inspection systems used to assign penalty points based on length and type of a defect along with the description of defects and the penalty counts that result.

SUMMARY

Embodiments of the invention provide a method, system and computer program product for reducing defects of a product being manufactured by a manufacturing apparatus.

The method, system and computer program product uses a heuristic approach to determine predicted damages of products while being manufactured and their defect occurrence ranges while keeping the initial expected defects, the respective classification, range of defects and damage mitigations.

In embodiments, the method, system and computer program product determines whether, for a fabric product being manufactured, given a prior knowledge of defects and the current measurement for a given length of manufactured product, if a given defect exceeds the initial expected penalty points for a particular defect, should the manufacturing apparatus be reset to manufacture a new length for a given order and will the length so far woven with the known defect counts and penalties be useful as can be measured from history.

In a further embodiment, the method, system and computer program product performs a dynamic computation of a damage mitigation range of operation while being within an overall set of constraints so as to complete the computation in smaller number of loops in edge computing devices so that the manufacturing equipment can operate at a higher velocity for higher quality of the output.

In an embodiment, there is provided a computer-implemented method for reducing defects of a product being manufactured by a manufacturing apparatus. The computer-implemented method comprises: receiving, using one or more processor devices, a defect level/range for a quality specification for the output manufactured product based on historical manufacturing data of the product; detecting, using one or more sensor devices, occurrence of defects in a product while the product is being manufactured, each defect corresponding to a class of defects; computing, using the one or more processor devices, a count of the defect occurrences in each defect class for the product being manufactured; dynamically comparing, using the one or more processor devices, a count of defect occurrences of a class with a target defect count level for that class that meets the quality specification; upon detecting a count of defect occurrences exceeding a target defect count level for that class of defect, determining, using the one or more processor devices, one or more damage mitigation measures to ensure a damage mitigation range of operation while being within a set of constraints to maintain the quality specification for the product; and controlling, using the one or more processor devices, a device of the manufacturing apparatus to mitigate the damages for remaining product manufacturing steps in response to the determined one or more damages mitigation measures.

In accordance with a further embodiment, there is provided a system for reducing defects of a product being manufactured by a manufacturing apparatus. The system comprises: one or more sensor devices configured to detect occurrence of defects in a product while the product is being manufactured, each defect corresponding to a class of defects; and one or more processors; and a memory coupled to the one or more processors for storing instructions configuring the one or more processors to: receive a defect level/range for a quality specification for the output manufactured product based on historical manufacturing data of the product; compute a count of the defect occurrences in each defect class for the product being manufactured; dynamically compare a count of defect occurrences of a class with a target defect count level for that class that meets the quality specification; upon detecting a count of defect occurrences exceeding a target defect count level for that class of defect, determine one or more damage mitigation measures to ensure a damage mitigation range of operation while being within a set of constraints to maintain the quality specification for the product; and control a manufacturing device of the manufacturing apparatus to mitigate the damages for remaining product manufacturing steps in response to the determined one or more damages mitigation measures.

In some examples, a computer program product for reducing defects of a product being manufactured is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with

DETAILED DESCRIPTION

Most continuous manufacturing processes have process variations that introduce damages in the output product which have to be managed within a range for the output to still be classified in the class that was expected at the start of the process, but the process introduced damages that are mitigated in the process have limits for the extent of correction. As damages occur and are mitigated, the range for mitigation/correction reduces and need to be adjusted for the future defects predicted to occur. Since the variables are related, this cannot be solved with traditional computational methods.

An illustrative example is the textile, e.g., including apparel, fabrics, tapestry or garments, manufacturing domain which industry implements loom manufacturing processes, e.g., weaving processes, that are subject to process variations that introduce damages in the output product, e.g., fabric, cloth or tapestry, to be managed. As known in the art, weaving is the intersection of two sets of straight yarns, warp and weft, which cross and interlace at right angles to each other. The lengthwise yarns are known as warp yarns and width wise yarns are known as weft or filling yarns and the fabric produced is known as woven fabric. The machine used for weaving fabric is a loom and being a complex system, a number of faults can occur in fabric during weaving process, e.g., warp streaks, reediness, weft bar, weft crack, thick and thin places, weft loops, box marks, high incidence of warp breaks, weft breaks, shuttle traps, shuttle flying, smashes, bad selvedge, knots, pilling, reed marks or streaks, etc.

Figure 1:
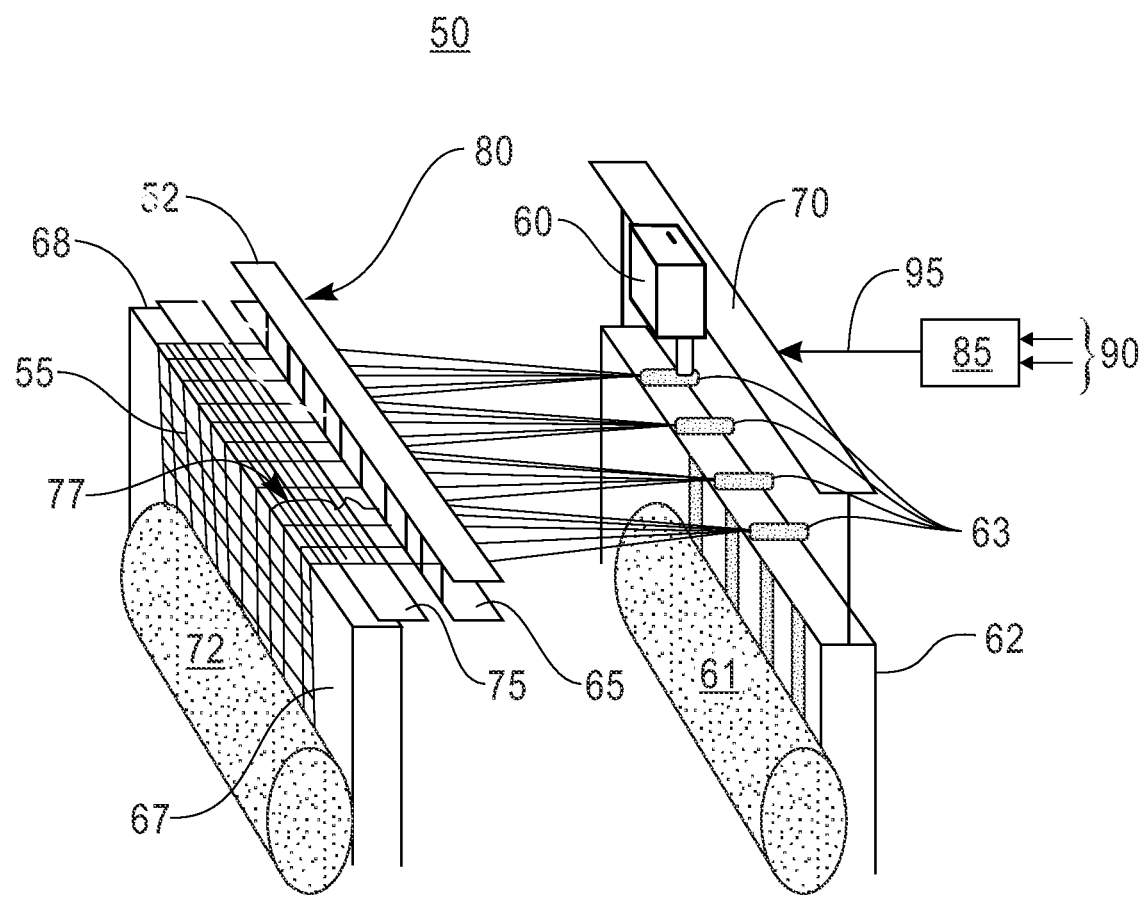
FIG. 1 illustrates an example Artificial Intelligence (AI)-based cloth manufacturing system in which exemplary embodiments of the invention can be employed.

FIG. 1 shows an example Artificial Intelligence (AI)-based cloth manufacturing apparatus 50 including a power loom or like weaving device 52 used to weave and output a fabric, cloth or tapestry 55. Typical components of the power loom include a warp feed drum 61, a warp beam 62, warp yarn bundles 63, a reed array Heddle 65, a breast beam 67, a weft shuttle block 68, etc. The AI-based system 50 depicted may include an Internet-of-Things (I-o-T)-based robotic device 60 including a robotic arm 70 that can be used to adjust the warp tension, adjust weaving spindles of the loom and/or perform other weaving equipment functions during the weaving process. The AI-based system 50 can include a dynamic vision inspection system 75, including, one or more devices such as visualization devices, e.g., video cameras, ultrasound cameras, and/or image sensor arrays, and/or haptic/sound I-o-T sensors 80 for use in determining the quality and acceptability for the fabric being manufactured. For example, the image sensor array 75 can be manipulated so as to frame the weaving process automatically, in real time, and capture images of the output fabric 55 while it is being woven. Such dynamic vision inspection system 75 can be used for detecting one or more defects/faults including, but not limited to: fault/defect rate, fabric construction, e.g., a loose warp 77, end to end or edge to edge shading, color, hand or feel, length/width, print defect and appearance. Fabric inspection ensures to minimize the rejection of cut panels or rejected fabrics due to fabric faults.

The Artificial Intelligence (AI)-based cloth manufacturing system 50 of FIG. 1 further includes one or more "edge" computers 85 interfacing with the I-o-T robotic system 60 to receive streams of data 90 from the Internet of Things (IoT) sensors that is used by the heuristic method computations to perform a heuristic based method including computations to prevent breakdowns and improve operations. In particular, edge computers 85 perform a number of computation to determine if the defect count/severity will allow the quality of the material/fabric to be maintained under the overall specification for the output/fabric. As a result of the computations, the edge computer 85 can generate signals 95 that drive the IoT sensor based robotics system, e.g., robotic arm 70, to correct/mitigate the defect and enable keeping the woven fabric within acceptable defect levels for different product quality levels.

In this example fabric manufacturing domain, the problem statement becomes: given the prior knowledge of weaving defects and a current measurement for a given length, if a given defect exceeds the initial expected penalty points for a particular defect, should the machines be reset to manufacture a new length for a given order and will the length so far woven with the known defect counts and penalties be useful as can be measured from history?

Since the variables are both of the raw material and process, the typical per yard or per 100 yards defect counts cannot be used as it is not linearly scalable and hence prior length's defect counts would be taken as a starting and expected defect counts can be established. Then during the weaving and continuous inspection, if, for example, one of the defect counts is reached/exceeded, what actions should the weaving team take to ensure that the output cloth is not rejected. If the weaving machines and quality control can be tightened for a remaining length to be woven, what has been the best set of penalties from prior runs for the different defects that the focus has to be on?

Linear programming or other techniques for multi-variate optimization are not applicable here since there is no optimization rule that can be minimized or maximized. Instead, the problem comes down to determining the set of achievable values of defect penalties and which defects to really apply control on or determine when to reset.

This problem comes down to determining the set of achievable values of defect penalties and which defects to really apply control on or determine when to reset.

In order to solve the above stated problem, one of the approaches is:

1. Take the nearest previous order, the defects in the different classes and the characteristics of each defect class to build the defect distribution for the new order. When this is done and based on the characteristics of each defect class, the expected counts are set, it may lead to a condition of the penalty points exceeding the limit for the class.

2. Identify, what is the variation that needs to be done for each class such that it is achievable for the weaving mill given its set of equipment and processes must be determined.

However, as this could become a large calculation cycle as many possibilities may be there, a heuristic approach provides a solution to the above problem that is not addressed yet in the manufacturing processes (e.g., fabric and cloth.)

The heuristic method determines the predicted damages and their ranges while keeping the initial expected defects, the respective classes and range of defect types/classes and mitigation.

The method dynamically computes a damage mitigation range of operation while being within the overall constraints and completes the computation in smaller number of loops in the edge computers so that the manufacturing equipment can operate at a higher velocity for higher quality of the output.

The system and method performs a conditional divide and spread of reducing error of the co-efficient and damage counts different from known techniques such as root mean square error, linear or equal distribution, log or reducing error distribution, etc.

Figures 2, 3:
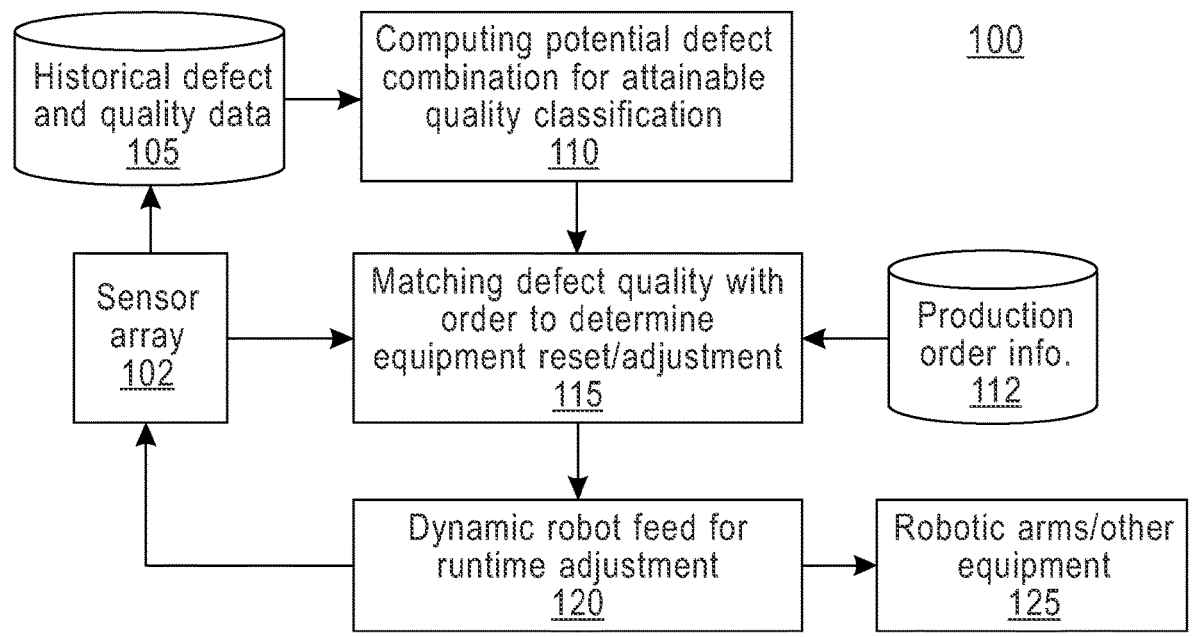
FIG. 2 is a diagram depicting one method for heuristic determination of in-process damage class control for managing expected output product category according to an embodiment.
FIG. 3 depicts an exemplary table that is used to correlate an amount of penalty points allotted as a function of a determined fabric length and/or type of the defect.

FIG. 2 shows a diagram depicting one method 100 for heuristic determination of in-process damage class control for managing expected output product category. For exemplary purposes, the product is an order for a length of woven cloth produced at a mill. More particularly, in the method 100, FIG. 2, steps are performed to estimate the quantity of defects that can be allowed (given amounts of defects in prior lengths) and determine which defects have the constancy and which are highly variable for determining an initial prediction and range for a new order (of a new length) such that the expected class is acceptable.

As shown in FIG. 2, at 102, the AI-based system employs video camera sensor array and haptics/sound IoT sensors to perform dynamic visualization and texture determination of the current product being produced by the equipment, e.g., fabric or cloth being weaved corresponding to a customer order and generates corresponding sensor data for further processing according to the methods herein. In an embodiment, AI-based system uses the dynamic visualization and texture determination with haptics/sound IoT sensors to predict damage occurrences in the raw material feed to adjust the process mitigation. At 105, this sensor array data for the current product is stored and eventually forms historical defect and quality data used for subsequent heuristic analyses in current and future product runs. At 110, FIG. 2, there is performed the computing of the potential defect combination for attainable quality classification. Then, at 115, based on the sensor array data, and based on received defect combination data for attaining a quality classification obtained from the computations of step 110, the method matches the defect quality with the current order information to determine whether any real-time adjustments to the equipment is required or whether the system needs to be reset and adjusted in order to match the quality with the current order being produced.

That is, with respect to FIG. 2 process steps 110, 115 are performed iteratively: given a set of numbers which satisfy all but some constraints in the form of inequalities involving those numbers (that is, there are some violations), the method determines how to arrive at a modified set of numbers which satisfy all the constraints (i.e., there are no violations).

In the method of FIG. 2, at step 110, the following steps are implemented to compute the potential defects combination for attainable quality classification. That is, the method step 110 entails accessing stored historical sensor data and running a method to compute three (3) sets of quantities $\{a_i\}$, $\{b_i\}$ and $\{c_i\}$ where, for a particular class i, "a" represents the minimum number of defects obtained, "c" is the maximum defects obtained from prior orders, and "b" is the typical count of defects for a class i. In an embodiment, selection of $a_i$, $b_i$, and $c_i$, is based on the operating conditions and the involved machines. The operating conditions are measured by sensors and used to create applicable subsets of $a_i$, $b_i$, and $c_i$. The applicable subset is transferred to edge-computing devices for dynamic decision-making.

In an embodiment, the method runs through the defects data stored at step 105, to compute the $\{a_i\}$, $\{b_i\}$ and $\{c_i\}$ quantities for a class i such that the following conditions of the problem statement are satisfied:

$$\Sigma_{i=1}^{n}(a_i) < \Sigma_{i=1}^{n}(b_i) < \Sigma_{i=1}^{n}(c_i) \qquad 1)$$

$$a_i < c_i \text{ for all } i=1 \text{ to } n \qquad 2)$$

$$a_i < b_i < c_i \text{ is } not \text{ true for at least one index } i \qquad 3)$$

Where equation 1) is the problem statement and equations (2) and (3) the initial constraints in the form of linear inequalities both at the individual number level and at an aggregate (the sum of the numbers) level.

In an embodiment, the $a_i$'s can be zeroes. Multiple sets of $b_i$'s can be initially formed and typically from a history database 105 a reduced set of combinations are selected such that equation (1) is satisfied. The sum of the $b_i$'s need to be less than the quality threshold for the class of the output. As an example, given 1000 yards of a cloth of a particular weave is being created, the first quality cloth can have up to 50 points per 100 yards for (ASTM D5430). There are different types of defects and different points for each sub-class in the defect. The $b_i$'s show the sum of the points for a defect class. When this fabric is going to be created, for the machines in use, the $a_i$'s and $c_i$'s are known (equations (2) and (3)) and sets of combinations of $b_i$'s are possible. For a similar production, the set closest to the achieved $b_i$'s are taken from this set. The $c_i$'s are the maximum quantity of defects which were attained in the manufacturing set up for that process.

At step 110, the method steps to compute "potential defect combination for attainable quality classification" is given by equations (4) to (6) that are run to find a new set of positive numbers $\{b_i'\}$ such that:

$$\Sigma_{i=1}^{n}(b_i)=\Sigma_{i=1}^{n}(b_i) \quad (4)$$

$$a_i<b_i'<c_i \text{ is true for at all indices } i=1 \text{ to } n \quad (5)$$

$$\{b_i'\} \text{ are minimally away from the } \{b_i\} \quad (6)$$

Additionally, computed is the following:

$$b_i'=w_i*b_i$$

where "$w_i$" is an auxiliary weight multiplier used to multiply the corresponding "$b_i$" value. Since not every number "$b_i$" is greater than the corresponding number "$a_i$", as a first step is to modify the numbers "$b_i$" by multiplying them with "$w_i$" to obtain a new set of numbers "$b_i'$" such that the corresponding $b_i'$ is strictly greater than it's corresponding $a_i$. Thus, what the original numbers $b_i$ fail at, the new numbers $b_i'$ succeed at.

During the course of manufacturing of, for example, a first 50 yards of cloth, amongst different classes and sub-classes, e.g., "n" defects are found, the algorithm recomputes the $b_i$'s as $a_i$'s get reset to the higher of existing $a_i$'s and the amount of points from the different defect classes detected thus far. New $b_i'$ are computed across iteratively till the equations (4) with constraints of equations (5) and (6) are satisfied.

Thus, returning to 115, FIG. 2, based on the sensor array data, and based on received defect combination data for attaining a quality classification obtained from the computations of step 110, the method steps of equations (4)-(6) are used to determine equipment reset/adjustment. For example, if no set of $b_i'$ is found satisfying the conditions, the iterative computation is stopped. When it stops, the difference of the $b_i'$ and $b_i$ in the last step is taken and the equipment contributing to those with the highest difference are the ones that need to be reset/adjusted. That is, for each class of defects (the class (i) in the equations), there is a correlation between the defect and the source which is attributable to a machine parameter. As an example, a detected "reediness" fault causing very fine cracks or lines between groups of warp threads, caused due to excessive warp tension, could be from improper spacing which can be adjusted to a bent reed which would need a reset by replacing with a new reed.

In FIG. 2, the method 100 matches the defect quality with the current order information to determine whether any real-time adjustments to the equipment is required or whether the system needs to be reset and adjusted in order to match the quality with the current order being produced. In embodiments, the current production order information is stored in a database or like memory storage system 112. In embodiments where an adjustment is needed, the process proceeds to step 120 where the IoT-based robot performs a dynamic runtime tool adjustment. That is, in an embodiment, at 120, the IoT-based robot 60 is configured to receive control signals to manipulate the robotic arms or other equipment at 125 to mitigate the damages in the manufacturing steps to ensure that the output class of the product remains what was expected at the start despite damages and mitigation measures. The process is iterative in that, upon performing any real-time robotic adjustments, the sensor array at 102 is further triggered to obtain further sensor array data for further dynamic visualization and texture determination to ensure defect mitigations and/or maintain the determined quality classification.

In an example implementation, for a detected "reedy" fabric class defect, the warp tension may have reduced or the distance between the front rest and back rest in the equipment could have moved beyond a pre-determined range, e.g., a range of between 12-24 mm, When the "reedy" defect point is high, the robot 60 is fed instructions to adjust some of the reeds to increase the tension or to tighten a handle to adjust the distance these while the weaving operation is on. These robots are inside the weaving equipment and are fed instructions to move to different positions to adjust.

Figure 4:
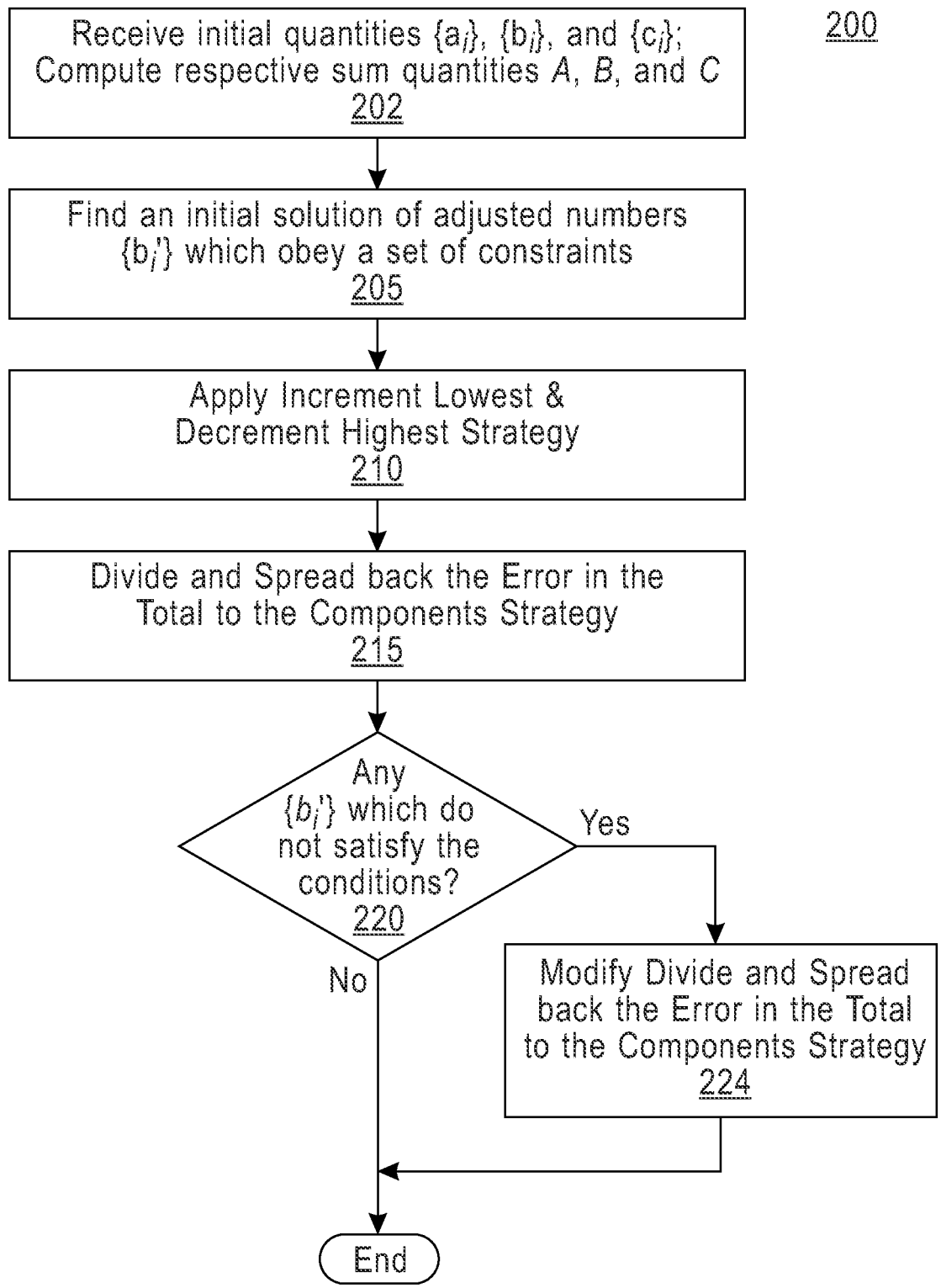
FIG. 4 depicts an iterative method providing a heuristic approach to determine predicted damages and their ranges while keeping the initial expected defects, the respective classes and range of defect and mitigations according to an embodiment.

FIG. 4 depicts an iterative method providing a heuristic approach to determine predicted damages and their ranges while keeping the initial expected defects, the respective classes and range of defect and mitigations in an embodiment. At 202, FIG. 4, the method obtains from the 105 database the initial three (3) sets of quantities $\{a_i\}$ (representing the minimum number of defects obtained for a particular class i), $\{c_i\}$ (representing the maximum defects obtained from prior orders for a class i), and $\{b_i\}$ (representing the typical count of defects for a class i). In an embodiment, selection of $a_i$, $b_i$, and $c_i$, is based on the operating conditions measured by sensors and the involved machines.

Further, the method at 202, FIG. 4, computes quantities A, B, and C obtained by letting:

$$\Sigma_{i=1}^{n}(a_i)=A \quad (7)$$

$$\Sigma_{i=1}^{n}(b_i)=B \quad (8)$$

$$\Sigma_{i=1}^{n}(c_i)=C \quad (9)$$

Then, at step 205, FIG. 4, there is performed making the numbers B greater than corresponding $a_i$'s. This is accomplished by first finding an initial solution of adjusted numbers $\{b_i'\}$ which obey the following set of inequalities:

$a_i<b_i'$ for all indices i=1 to n.

Let $b_i'=w_i*b_i$

To this end, at 205, the following system of equations 10) and 11) is to be solved:

$$\Sigma_{i=1}^{n}(w_i)(b_i)=B \quad 10$$

with the constraints $$w_i*b_i>=a_i \quad 11$$

for all i=1 to n.

The constraint can be re-written as follows:

$$w_i=(a_i/b_i)+\delta_i$$

for some number $\delta_i>0$

Now the following solution is used:

$$\delta_i=(B-A)/(n*b_i),$$

which is clearly >0 and clearly satisfies condition (1) above.

Continuing to step 210, FIG. 4, the method employs a strategy to "Apply Increment Lowest and Decrement Highest." Here, it is observed that the new numbers $\{b_i'\}$ are now given as:

$$b_i'=a_i+b_i*\delta_i.$$

At this stage, it has been ensured that $b_i'>a_i$.

This method solves the next problem of making the $b_i'<c_i$. Thus, it is desired to re adjust the $\{b_i'\}$ in such a way that: the quantities $\{c_i-a_i-b_i*\delta_i\}$ are all positive. Then the objective will be met.

In an embodiment, an algorithm is run to achieve this iteratively by identifying in each step the largest and the smallest of the numbers $\{c_i-a_i-b_i*\delta_i\}$. It is noted that the largest number will be positive and the smallest number will be negative. All the numbers cannot be positive because of the constraint of equation (2) in the problem statement. Then, the method can iteratively "take away" a portion from the largest number and "give" to the smallest number and continue doing this until both the numbers become >0.

Figure 5:
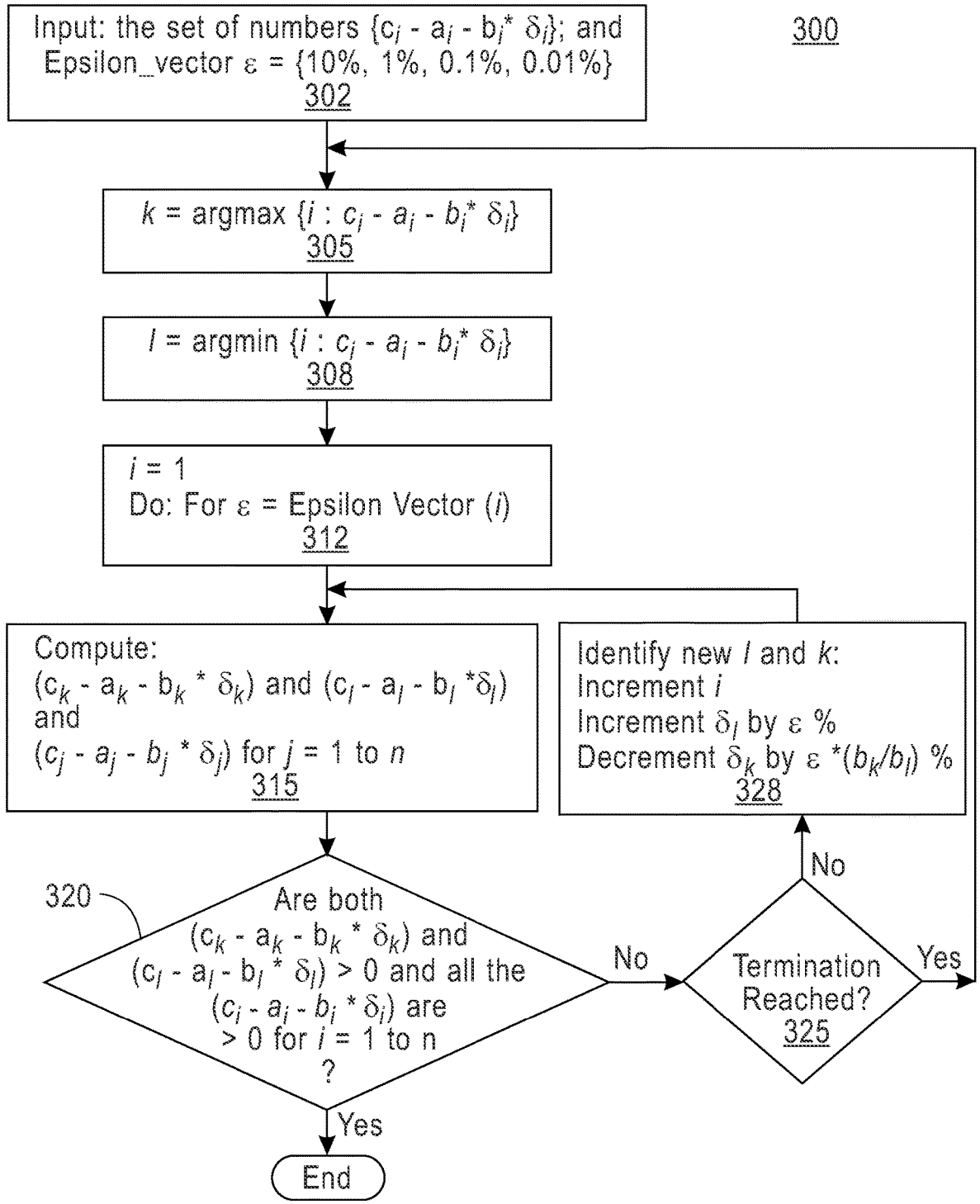
FIG. 5 depicts an "Increment Lowest and Decrement Highest Differences" method implemented in an embodiment of the heuristic approach of FIG. 4.

FIG. 5 shows an "Increment Lowest and Decrement Highest Differences" method 300 run to achieve this. An initial step 302 includes receiving a set of input numbers: {i: $c_i$-$a_i$-$b_i$*$\delta_i$} and define an initial vector: $\varepsilon$={10%, 1%, 0.1%, 0.01%}. Then at 305, there is performed letting: k=argmaxi: {$c_i$-$a_i$-$b_i$*$\delta_i$} and at 308, letting: k=argmini: {$c_i$-$a_i$-$b_i$*$\delta_i$}.

The strategy taken is as follows:

Fix a rate: "$\varepsilon$" in {10%, 1%, 0.1%, 0.01%} taken from the Epsilon_vector input at step 302.

Additional steps include replacing $\delta_k$ by $\delta_k$*(1-$\varepsilon$') and replacing $\delta_l$ by $\delta_l$*(1+$\varepsilon$). It is noticed that:

$$\delta_k=(B-A)/(n*b_k)=d/(n*b_k)$$

So after replacements, the new values $\delta_k$, $\delta_l$ are obtained as follows:

$$\delta_k=\{d/(n*b_k)\}*(1-\varepsilon') \text{ and } \delta_l=\{d/(n*b_l)\}*(1+\varepsilon)$$

It is ensured that the quantity d remains the same before and after the replacements. This yields a relationship between $\varepsilon$' and $\varepsilon$ and as follows:

$$\varepsilon'=\varepsilon*(b_k/b_l)$$

Then, in the "Increment Lowest and Decrement Highest Differences" algorithm, the method includes initializing at a first step 312 the index i in order to fix an $\varepsilon$% in a "Do-For" loop, where in each pass of the Do-For loop the $\varepsilon$% is incremented, e.g., according to 10%, 1%, 0.1%, 0.01%. After initializing in the loop, there is performed a next step 315 for computing the quantity ($c_k$-$a_k$-$b_k$*$\delta_k$) and computing the quantity ($c_l$-$a_l$-$b_l$*$\delta_l$) and the computing of the quantity ($c_j$-$a_j$-$b_j$*$\delta_j$) for all defect class values of j=1 to n. Then, at step 320, a determination is made at 320 as to whether the computed quantities ($c_k$-$a_k$-$b_k$*$\delta_k$) and ($c_l$-$a_l$-$b_l$*$\delta_l$) are both greater than 0 (>0), and additionally, whether all the computed values ($c_j$-$a_j$-$b_j$*$\delta_j$) are greater than 0 for all j=1 to n. If these determinations hold, then the process for the current iteration terminates, otherwise it repeats for the next iteration of and the loop repeats for the new value of $\varepsilon$. If it determined that these computed quantities do not hold, then the process continues to step 325 to determine if a termination condition has been reached, i.e., all computations for each iteration of "i" of the epsilon vector has been determined and evaluated in the manner at step 320. If the termination condition has not been reached at 325, the process proceeds to 328, FIG. 5 to increment i (of the epsilon vector), to identify new l and k values, and to increment $\delta_l$ by $\varepsilon$% and decrement $\delta_k$ by $\varepsilon$*($b_k$/$b_l$)% and return to step 315 in order to repeat the computations of ($c_k$-$a_k$-$b_k$*$\delta_k$), ($c_l$-$a_l$-$b_l$*$\delta_l$) and values ($c_j$-$a_j$-$b_j$*$\delta_j$) for all j=1 to n and perform their respective evaluations at 320. Otherwise, if it is determined that a termination condition has been reached at 325, FIG. 5, the process proceeds back to 305 to re-do computations to obtain new l and k value computations and repeat the FOR loop processing beginning at 312, FIG. 5 with the new l and k numbers.

Thus, in an example, given two numbers: a large number and a small number, where the larger number is >0 and the smaller number is <0: In the "Increment Highest Decrement Lowest" strategy 300 depicted in FIG. 5, the objective is as follows: whenever there is found a such a pair of two numbers, it is desired to replace them with another pair of numbers which are both >0 and which do not change certain other conditions satisfied by the original pair. This is iteratively achieved by the method of FIG. 5 by: 1) reducing the larger number by a certain small amount; and 2) increasing the smaller number by another suitable small number. The rate "s" is the rate at which this increase-decrease step is performed within a single step of the iteration procedure. At the end of the iteration, a new pair of numbers remain which are both >0 as required. Here, the $\delta_k$ and $\delta_l$ are just the "delta" numbers corresponding to the indices k (chosen as an argmax expression) and l (chosen as an argmin expression) where both k and l are suitably chosen index values: k=that index value "i" for which {$c_i$-$a_i$-$b_i$*$\delta_i$} takes the largest value and l=that index value "i" for which {$c_i$-$a_i$-$b_i$*$\delta_i$} takes the smallest value. Since the calculation above, $\delta_i$=(B- A)/(n*$b_i$), has already been made for i=1 to n, the numbers $\delta_k$ and $\delta_l$ can always be chosen from that set by first calculating k and l as above.

Returning to step 215, FIG. 4, the method employs a strategy to "Divide and Spread back the Error in the Total to the Components Strategy." In the previous step 210, the method ensured that the differences {$c_i$-$a_i$-$b_i$*$\delta_i$} all become positive. However, in the process of achieving this, it is generally observed a departure from the condition (1), namely:

$$\Sigma_{i=1}{}^{n}(b_i')=\Sigma_{i=1}{}^{n}(b_i)$$

In other words, the sum of the new numbers {$b_i$'} is not the same as the sum of the original numbers {$b_i$}. Thus, at step 215 there is applied a strategy of spreading back the error in total to the components, while preserving the results achieved in the previous step 210.

Figure 6:
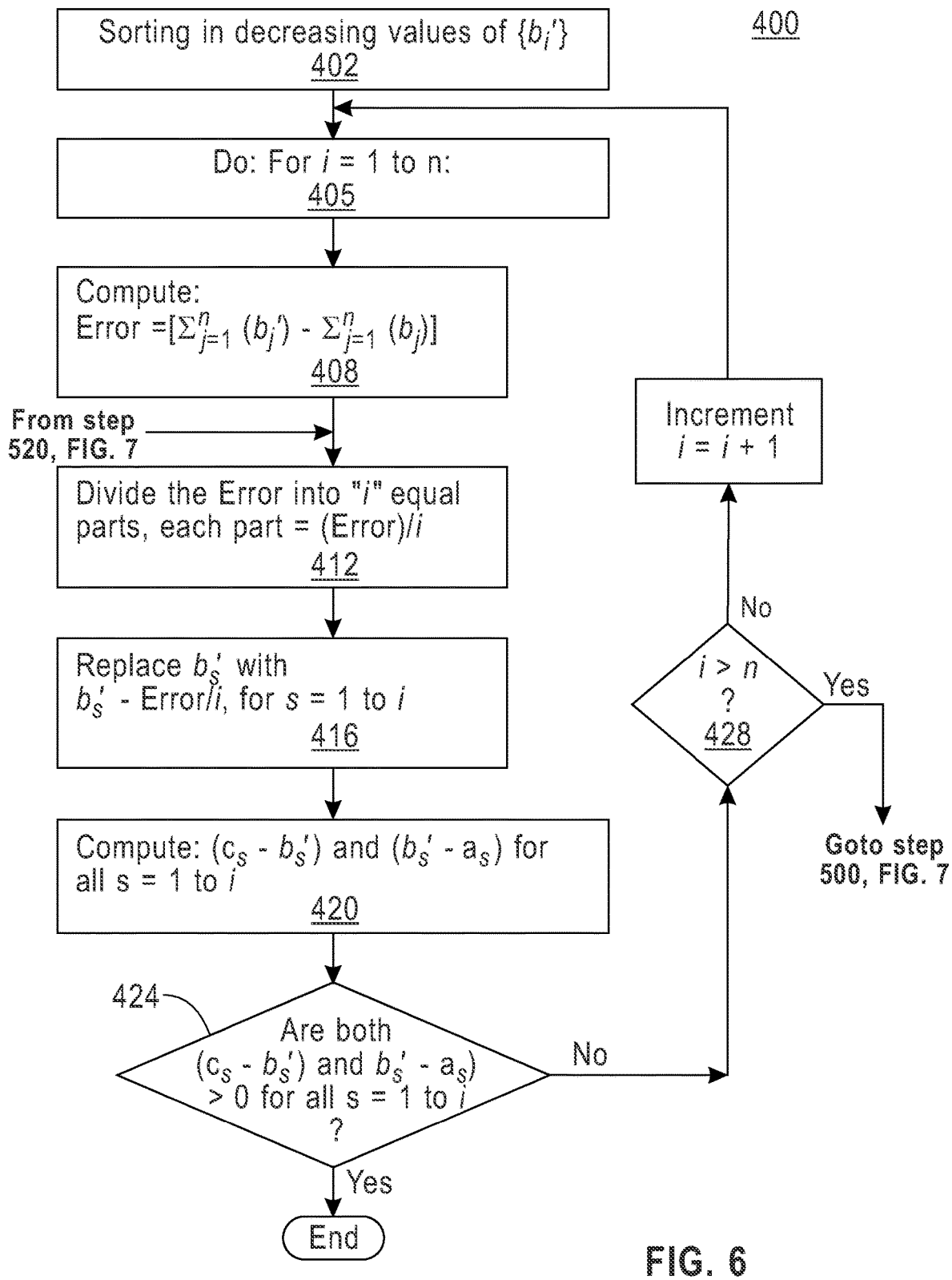
FIG. 6 depicts a "Divide and Spread back the Error" method implemented in an embodiment of the heuristic approach of FIG. 4.

The algorithm steps include first defining an error variable:

$$\text{Error}=[\Sigma_{i=1}{}^{n}(b_i')=\Sigma_{i=1}{}^{n}(b_i)]$$

Where it is initially assumed that Error>0. The strategy of dividing and spreading the error is summarized algorithmically in view of FIG. 6 showing a Divide and Spread back the Error method 400 as follows: A first step 402, FIG. 6, performs a sorting in decreasing values of the values {$b_i$'}. A next step 405 initializes a "Do-For" loop where an index i is iterated from values 1 to n, i.e., For i=1 to n. In the Do loop, at step 408, FIG. 6, the method computes the error: Error=[$\Sigma_{j=1}{}^{n}$($b_i$')−$\Sigma_{j=1}{}^{n}$($b_i$)] and at 412, divides the Error into "i" equal parts, each part=(Error)/i. Then, there is performed the step of absorbing each Error part into top i values of $b_i$' in the sorted list. That is, at 416 there is performed a replacing of $b_s$' with $b_s$-Error/i, for s=1 to i. Then, at 420, there is performed the step of computing the quantities ($c_s$-$b_s$) and ($b_s$-$a_s$). Then, at step 424, a determination is made as to whether the computed quantities ($c_s$-$b_s$) and ($b_s$-$a_s$) are both greater than 0 (>0) for all index values s=1 to i. If both computed quantities ($c_s$-$b_s$) and ($b_s$-as) are not all positive for all indices s=1 to i, then the process proceeds to step 428 where a determination is made as to whether i<n or not. If i is <n then proceed to increment the index i (i.e., i=i+1). Then the process returns to 405, FIG. 6 to again perform the steps 405 to 424. Otherwise, at step 428, if it is found that i>n then the process proceeds to step 500, FIG. 7. On the other hand, if at step 424, it is determined that computed quantities ($c_s$-$b_s$) and ($b_s$-$a_s$) are both positive for all s=1 to i, then the process ends. In this embodiment, if it is determined that the initial Error<0, the same method steps 400 of FIG. 4 is performed however, at step 416, the Error parts are added instead of subtracted.

Returning to step 215, FIG. 4, the method 200 can additionally employ a modified "Divide and Spread back the Error in the Total to the Components" strategy. Specifically, it is still possible that the "Divide and Spread the Error" strategy of step 215, FIG. 4 may fail. That is, as determined at step 220, FIG. 4, even after the last step, there may be left values of $\{b_i'\}$ which do not satisfy the conditions 1)-3). However, if there remain values of $\{b_i'\}$ which do not satisfy the conditions, this discrepancy is rectified by applying the "Modified Divide and Spread the Error" algorithm, which is summarized algorithmically as a method 500 shown in FIG. 7. Particularly, after performing a sorting in decreasing values of the values $\{b_i'\}$ at 502, a next step 505 enters a Do-For loop where the method iterates index i for i=1 to 25. Then, at 510, FIG. 7, there is performed calculating the Error in the current table as: Error=$[\Sigma_{i=1}''(b_i')=\Sigma_{i=1}''(b_i)]$. Then, at 514, half the error is taken in one iteration, i.e., replacing the Error according to: Error=Error/2.

Then, the next step 520 performs a reset of i=1 prior to performing the "Divide and Spread the Error" algorithm 400, FIG. 6, on the Error/2. Thus, after the reset i=1, the method returns to steps 412 to 424 of the method 400 of FIG. 6 and are repeated using the Error/2.

If the error values are not extremes, the optimization of the heuristic approach of FIG. 4 will provide the right values of $b_i'$ quickly. Extreme values refer to when the range between the numbers $a_i$ and $c_i$ is very wide, e.g., when $a_i$ is a very small number compared to $c_i$ which turns out to be a relatively very large number. Advantageously, the method works best when the range between $a_i$ and $c_i$ is narrow.

Thus, a problem is an instance that there is a set of defect counts (numbers $b_i$'s) such that not all of them lie between their bounds (numbers $a_i$'s and $c_i$'s). The approach depicted in methods of FIGS. 4-7 require the numbers go through an iterative algorithm in such a manner that at the termination, the algorithm ensures all the defect counts fall within the acceptable quality bounds.

Figure 7:
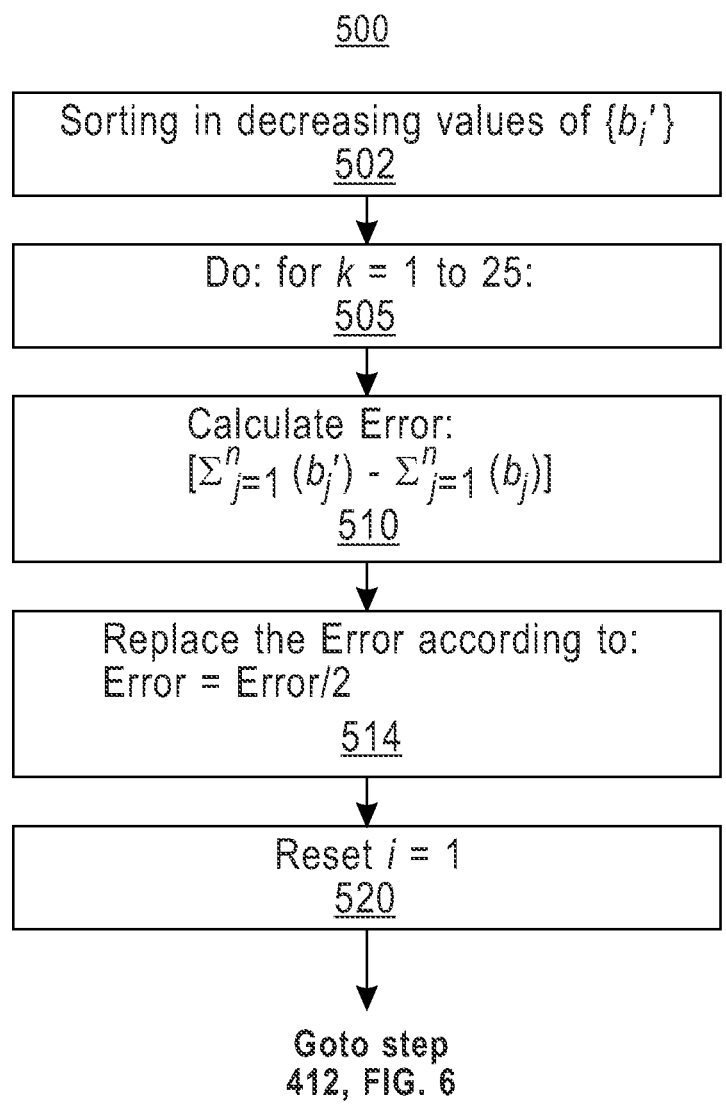
FIG. 7 depicts a "Modified Divide and Spread back the Error" method implemented in an embodiment of the heuristic approach of FIG. 4.
Figure 8:
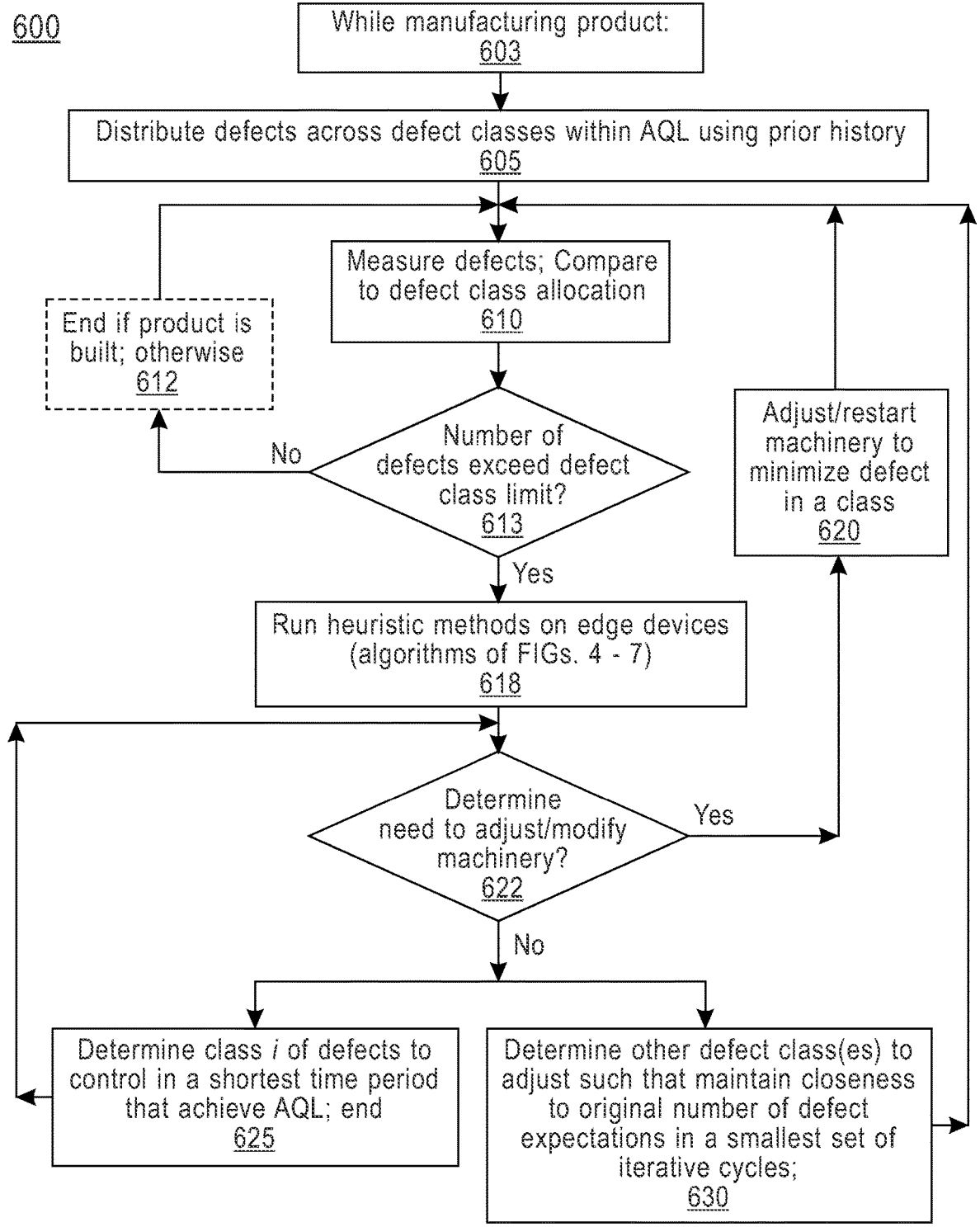
FIG. 8 depicts an overall computer-implemented method employed by a manufacturing system in an embodiment depicted in FIG. 1.

FIG. 8 depicts an overall computer-implemented method employed by a manufacturing system, e.g., the weaving mill depicted in FIG. 1. For example, while manufacturing a product at 603, the method includes at 605 distributing potential defects across the defect classes within an acceptable quality level (AQL) using the prior history of manufactured products. At 610, the control system haptic/I-o-T sensors and visual inspection station situated at the manufacturing line are run at 610 to measure the specific defects ($b_i$'s), e.g., defects associated when the product is being manufactured (e.g., while weaving is occurring). This step includes comparing the amount of measured defects against any allocated defect class. This enables the determining which defects are frequently occurring. Then at 613, a determination is made as to whether the number of defects found exceeds a defect class limit. If a defect class limit is not exceeded, the process returns to 610 assuming the product is still under manufacture, or otherwise, the method will end at 612 if the product manufacturing has completed. If, at 613, it is determined that the number of defects has exceeded a defect class limit, the method proceeds to 618 where the edge computer devices run the methods of the heuristic approach detailed in FIGS. 4-7. Resulting from the methods run in FIGS. 4-7, a determination is made at 622 as to whether to stop the run to adjust/modify the machines used in the manufacture. Whether to stop the run and adjust the machines is decided when the algorithm terminates, i.e., when a suitable set of numbers or "$b_i$'s" have not been found which satisfy all the constraints 4)-6). For example, the iterative process will continue when valid $b_i$'s satisfying the constrains have been found or based on some $b_i$'s and a robotic adjustment of the plant equipment can be achieved so that valid $b_i$'s are found. Another condition is when there if found a different combination of production lots which result in a different set of $a_i$'s and $c_i$'s making the current $b_i$'s valid.

If at 622, for a type of the defect classes that exceed a defect class limit, if it is determined that there is a need to adjust machinery, the process proceeds to 620 to adjust/restart the machinery to minimize the defect in the particular class and the process returns to step 610 to continue performing steps 610-622 and continue measuring the defects and comparing the defects against the defect class limits.

Otherwise, if at 622, if there is no determined need to adjust/modify the machinery (even though a number of defects detected exceed a defect), the process can proceed to 625 to address a first use case scenario. For example, at 625, in the case of a woven product manufacturing defect, if any determined defect exceeds a limit at the earlier lengths as compared to a prior history, the method determines which of the defects to control in the shortest time with the best impact to achieve the AQL. That is, as the defect counts are measured by the numbers $b_i$'s in the algorithm, the system looks for that subset of the numbers $b_i$'s which lie outside the specified quality bounds (measured by the numbers $a_1$'s and $c_i$'s). It is exactly these defects which are to be controlled. Defects are controlled by adjusting the machines by tuning it's parameters. IOT/haptic sensors measure the quality of the defects and robots are used for tuning the machines.

Then the method returns to 622 and the cycle repeats to determine if any other machinery adjustment/modification is needed based on number of other defects found in another determined defect class to be controlled as found at 625.

Otherwise, returning to 622, if there is no determined need to adjust/modify the machinery (even though a number of defects detected exceed a defect), the process can proceed to 630 to alternately make a determination as to whether there exists other defect class(es) to adjust so as to maintain closeness to an original number of defect expectations in a smallest set of iterative cycles.

Figure 9:
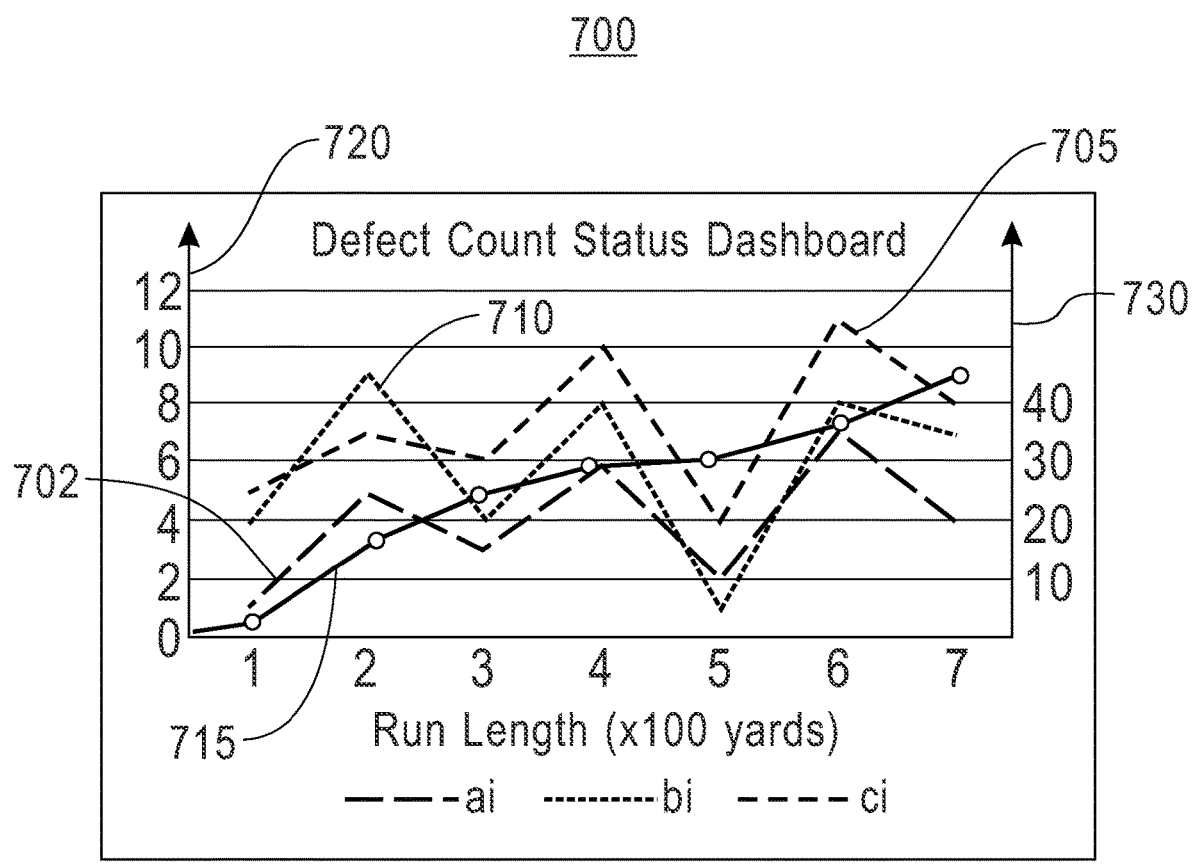
FIG. 9 depicts a defect status count dashboard displayed on a computer device depicting on the Y-axis a number of defects and the X-axis a quantity of product in accordance with an embodiment.

For example, in the example use case of manufacturing a woven product, by the time 600 yards of cloth are woven, one of the defects exceeded the upper bound than what was achieved earlier, since it is known that during the remainder weaving, which defect class(es) should be controlled to remain lower than expected so that overall penalty levels/AQL are met. This problem breaks down into adjusting the defect expectation across the other defects such that while still close to the initial set expectations for the machinery and process, the method determines which defect class(es) can be adjusted such that the overall movement is the least. In an embodiment, edge computing devices can generate for a user view a presentation of a defect count status. For example, FIG. 9 depicts a defect status count dashboard 700 displayed on a computer device depicting on the Y-axis 720 a number of defects per amount of yardage (e.g., 100 yards) and the X-axis a quantity of product, e.g., a length of material being woven, e.g., in hundreds of yards. As shown in the dashboard view 700, a plot of the computed sets of quantities $\{a_i\}$, $\{b_i\}$ and $\{c_i\}$ is provided where, for a particular class i, a first plot 702 represents the minimum number of defects obtained, "a", a second plot 705 represents the maximum defects obtained from prior orders, "c", a third plot 710 is the count of defects "b" for the class i for each 100 yards run, and a fourth plot 715 is the cumulative count of defects "b" for the class i. As shown in FIG. 9, the right side of the plot depicts the cumulative amount of defects 730, e.g., "$c_i$" of 10, 20, . . . , 40. Use of the plot 700 of FIG. 9, it can be determined which class of defects $b_i$ exceed the prior known upper limits $c_i$ from the history data. For the cloth weaving use case example, during the weaving and continuous inspection, if one of the defect counts is reached/exceeded, it is determined what actions should the weaving team take to ensure that the output cloth is not rejected. If the weaving machines and quality control can be tightened for a remaining length to be woven, it is determined what has been the best set of penalties from prior runs for the different defects that the focus has to be on. Thus, as long as the defect count is still outside its bounds (i.e., specified by the numbers $a_i$'s and $c_i$'s in the algorithm), the machines need to adjusted so as to improve the quality and thus reduce the defect count in the next iteration. The overall movement is measured by the changes in the $a_i$'s and $c_i$'s (e.g., increases and decreases) when a defect class combination is changed.

Returning to FIG. 8, after the determination of whether there exists other defect class(es) to adjust so as to maintain closeness at 630, the process proceeds back to 610 to continue performing steps 610-622 and continue measuring the defects and comparing the defects against the defect class limits. This is achieved by applying the heuristic methods of FIGS. 4-7 with the aid of the plot 700 shown in FIG. 9.

In a second use case, the methods representing the heuristic approach of FIGS. 4-7 control the system of FIG. 1 to determine, if as the defects increased and the penalty limit was breached, and with the adjustments to the machinery, as quality increased, the excess length needed to keep the penalty within the AQL where knowing the defects that occurred in the initial lengths, perform a recomputation on the expected defects to the end using the counts of defects of different types that were there in the initial weaving. A quick computation of the $b_i'$ is to performed multiple times such that a low cycle loop approach is applied. That is, the $b_i$'s needs to be computed quickly such as when the weaving equipment is running and certain types of defects ($b_1$, $b_2$, etc.) have exceeded the respective upper limits $c_1$, $c_2$, etc. The usual computation cycle runs recursively through many cycles to determine the set of $b_i$'s that satisfy updated conditions which takes in fair computing power and time. Low cycle loop approach is needed to quickly determine first set of $b_i$'s meeting the conditions which may not be global optimum but satisfies the current running requirements to avoid stopping the equipment. If low cycle loop approach does not give first set of $b_i$'s within the small number of recursive loops run, then the equipment has to be stopped.

As referred to herein, the low cycle loop approach is one where based on current defects that form the $b_i'$ for the measured defect classes up to that point, the proportionate $b_i'$ for the remaining length is computed and put in the set, the iterative cycle of spreading is now reduced and only a smaller portion of $b_i'$ left have to be computed which will result in a smaller set of iterative cycles. As an example, if about 10 classes of defects of the larger set of defects (e.g., can be 23 in some cases or higher as specified by a customer) have defect counts and extrapolating (as one way to provide a likely total defect for the whole length) these for the remaining manufacturing left, one sets the range for these 10 defects. The modify-divide-spread is applied across the remaining 13 classes only which will lead to shorter iteration cycles to reach the end point. In one embodiment, the reduction in number of cycles can be done by reducing the number of cycles of iteration by the proportion of the defect classes for which the modify-divide-spread is to be applied than the set number of cycles.

The methods representing the heuristic approach of FIGS. 4-7 provides for the obtaining a narrow set of possibilities and choosing the first one occurring from it as an embodiment within a small set of computation cycles.

Considering that if there was a prior order that was successfully met, then the count of defects can be set as the expected defect counts. If, however, the current order is of a different length larger than a prior successful order, then if for the current length the defect counts/penalties would exceed the maximum penalty count for the length, then the ranges for each of the defect classes are established based on prior defect counts for various defect orders and being able to accommodate the increased length.

Assumptions are that the rate of increase is non-linear with some classes occurring randomly to ones in longer lengths to ones in shorter lengths of woven cloth.

In an embodiment, an example application of such an approach is demonstrative:

In the example, it is given that the weaving of a pattern of cotton material for a determined order length, e.g., a length of 1000 yards, is to be undertaken. In a prior case, the weaving mill was able to satisfy an order of 700 yards just meeting the penalty points with a distribution of defects (such as using the "Dallas 4" point system) and the width of the cloth is, for example, 120 inches getting about 930 penalty points (930*3600/(120*700)) gives close to a value of 40 as the average penalty). As example of a fabric inspection method such as the Dallas 4 point system, FIG. 3 depicts an exemplary table 150 that is used to correlate the amount of penalty points allotted 170 as a function of the determined length and/or type of the defect 160. The 930 points were made of 100 small holes or openings, 50 9" long defects, 70 6-9" long defects, 100 3-6" defects and 120 3" or less length defects. Here, the total penalty points for a manufactured lot length is obtained during the visual inspection and the quality of the cloth is determined by the penalty point factor for the lot but is measured as the defect values per 100 square yards. In the above calculation the length is 700 yards and the width is 120 inches. Converting inches to yards is dividing by 36 and since the penalty point factor is per 100 square yards, the 100 multiplier was used (i.e., as the total penalty points for a manufactured lot length is obtained during the visual inspection and the quality of the cloth is determined by the penalty point factor for the lot but is measured as the defect values per 100 square yards).

For the new order of 1000 yards, one cannot directly linearly extend the number of penalty points as the variables are not independent nor is the quality as consistent to provide that scaling.

Hence to extend this, assuming it is the same pattern and type of yarns, the system and method takes other prior production figures and defect figures to estimate the quantity of defects that can be allowed such as, e.g., a prior 500 yard, 600 yard and 300 yard to determine which defects have the constancy and which are highly variable and come up with the initial prediction and range for the new order such that the expected class is acceptable. About 1300 defect points can still yield the quality required and the range of allowable defects attainable could be: 10-30 large holes, 110-135 small holes, 60-90 9" long defects, 80-95 6-9" defects, 130-150 3-6" defects and 150-180 3" defects. Such a range being derived from the historical production orders and the range of movement of the defects.

In this particular example, the defects did not include the large holes, but from prior history the data may be available that large holes can occur and is provided for in the calculation. To obtain these ranges, the calculation looks at the historical performance that had been achieved across different orders and normalized to the common factor such as defects per 100 sq. yards and compares to the current defect quantities normalized to the counts/100 sq. yards. Selection of $b_i$'s that are greater in the same proportion as length left to be woven compared to the current defect count in the category is made as a starting point and remainder $b_i'$, can be made in shorter iterative cycles.

In an exemplary application of the heuristic approach depicted in the methods of FIGS. 4-7, there is described a further example use case of logistics transportation in retail and distribution industry. Here, there is formulated a problem of a mix of products (e.g., in retail such as chocolates or soft drinks) to be moved from factory to a distribution site as determined from the distribution and demand plans. However, there are times when the transportation may be able to take additional material when not fully loaded due to dynamic demand and as per plans or that different vehicle types are used than in the plan or reduced load than as planned due to various problems with container availability to emergency transportation of other stocks. Using predictions, the mix for the "delta" load has to be taken. There is no automated mechanism to do such a determination of the SKU mix in real time for a load volume different from the planned load unless the human subject matter expert (SME) is available in the loop. Just following the prior best solutions may not fit in since it misses several factors that are not known to the system but used by the SME in the decision making that makes a prior best solution a sub-optimal one due to non-consideration of all the factors. There is thus a need to improve the current solutions adding the human intelligence capability from prior captured knowledge in the logistic system as a heuristic solution that works well within the boundaries of this problem.

In a current solution, using standard prediction techniques and using prior best solutions, the linear programming (LP) approach is usually taken resulting still in sub-optimal solutions in multiple instances. The LP problem usually considered is the max stock available in the factory for dispatch for different product SKUs and the cost factor-carrying cost at factory vs. distributor site and likely profit if the dispatched material is sold before the next load reaches the distribution center. There are several instances where the LP can become unbounded or infeasible. Typically, the transport by road with the appropriate container would be set-up by the LP. However, if only partial container is available for a variety of reasons or a larger container is available, the space computation can be a fraction of the standard SKU box sizes leading to higher cost of transportation. Given such a scenario, in the case of reduction of the container volume, a set of cartons of different SKUs can be loaded as per the LP for the fixed next lower container size. This leaves some space in the container which could be utilized with the proposed mechanism. For the remainder of the space, it is not an easy task to determine what is the mix of the SKU's which are in their set boxes, that can still be close enough to the original SKU mix. That is, when there are dozens of SKUs, it is not an easy task as many combinations will be valid to fill up the space. Due to the reduced container space, the planned distribution is not going to take place that can lead to shortages for some of the SKUs. The goal is to minimize the stock-outs by keeping such mix close to the SKU mix of the original container.

As an example, the original container volume is x*y*z and the available space for variety of reasons is (x')*y*z and the nearest container standard volume is v*y*z for fitting in the appropriate number of cartons of SKUs. (x'-v)*y*z is the remaining volume where the individual packets inside a carton are taken to stock as may be permissible in sealed flexible packaging.

Using the heuristic approach of FIGS. 4-7 considers the historic information of the best solutions and for the product mix for the delta load. There is thus a need to determine the impact of the reduced volume to the individual SKUs and the basic unit counts difference in a carton which will form the $\{c_i\}$ values and $\{a_i\}$ is zero in this example. The problem is to determine the different $\{b_i\}$ that will form the volume of (x'-v)*y*z to be fed in. In an embodiment, $a_i$ and $c_i$ are the minima and the maxima of different SKUs possible in the orders serviced in a shift constrained by the variable warehouse space and the minimum distance to service an order. So $b_i$ will between $a_i$ and $c_i$ for different SKUs.

The starting point of $b_i$'s is set by using the (x'-v)/x ratio on the $c_i$'s. However, since the values are step based than continuous, there will be some unfilled volume left for all of the combinations. Selecting the best fit combination based on the historical data enables the proper selection. Thus, the method performs:

1) Selecting an "i" such that volume $\Sigma b_i * n$ is greater than (x'-v)*y*z. $a_i < b_i < c_i$ is not true for at least one index I;
2): Computing a new set of positive numbers $\{b_i'\}$ according to methods 4)-6) above:

$$\Sigma_{i=1}^{n}(b_i') = \Sigma_{i=1}^{n}(b_i) \quad\quad 4)$$

$$a_i < b_i' < c_i \text{ is true for at all indices } i=1 \text{ to } n \quad\quad 5)$$

$$\{b_i'\} \text{ are minimally away from the } \{b_i\} \quad\quad 6)$$

Letting $b_i' = w * b_i$, and re-writing the constraint as:

$$w_i = (a_i/b_i) + \delta_i,$$

for some number $\delta_i > 0$

Now given equations 7)-9) the following is obtained:

$$\Sigma_{i=1}^{n}(a_i) = A \quad\quad 7)$$

$$\Sigma_{i=1}^{n}(b_i) = B \quad\quad 8)$$

$$\Sigma_{i=1}^{n}(c_i) = C \quad\quad 9)$$

and using the following solution:

$$\delta_i = (B-A)/(n * b_i);$$

$$b_i' = a_i + b_i * \delta_i.$$

The method of FIGS. 4-7 are performed, particularly the "Increment Lowest and Decrement Highest Differences" algorithm of FIG. 5, the "Divide and Spread back the Error in the Total" to the SKU's strategy of FIG. 6 and if the "Divide and Spread the Error" strategy fails, the "Modified Divide and Spread the Error" of FIG. 7 is performed. In most cases as long as the values are not extremes, the optimization will provide the right values of $b_i'$ quickly that satisfies the constraints.

In a further exemplary application of the heuristic approach depicted in the methods of FIGS. 4-7, there is described a further example use case of warehouse placement to optimize picking operations. Here, there is formulated a problem in a distribution center (DC), where the picking time is key as it adds to the distribution cost. Rightly placed materials and with sufficient quantity is key to this optimization issue. Determination of this placement for a dynamic demand or one with high elasticity could be that lots of different SKUs spread apart for a multi-loading bay DC could mean increased picking time and hence the cost.

Current warehouse management solutions provide recommendations but the ability to use prior best practices knowledge in the solutions is not easy. Since the information of what composition worked best based on the available lots varies, standard techniques such as linear programming do not provide optimal solutions in a large number of scenarios. LP applies for only carton based distribution and where the SKU's have come in both cartons and in flexible packaging or where during clean-up operation, opened cartons with less than (<) half the number of individual units are removed with the units being kept in flexible packaging it becomes a infeasible solution condition. Instead of keeping the flexible units together, a solution is to determine whether can a distribution be done where using the existing information on combination of SKUs in an order and the typical quantity for a shift for such order group SKU's can be kept together to cut down the number of movement steps in picking of orders.

Using the knowledge of the picking staff and from the SKU grouping by orders, the flexible quantity to be kept at different points for a shift can be computed after the LP determines the number of cartons to be moved prior to start of the picking operation. The initial starting solution determines some points where the flexible stocking SKUs is greater than (>) a carton count and the solution steps as described previously are applied. The distribution of the flexible stocking SKUs for each shift can be easily determined and from this information the number of movement steps reduced during picking operations in a shift and savings can be obtained to track the benefits of using this solution.

Figure 10:
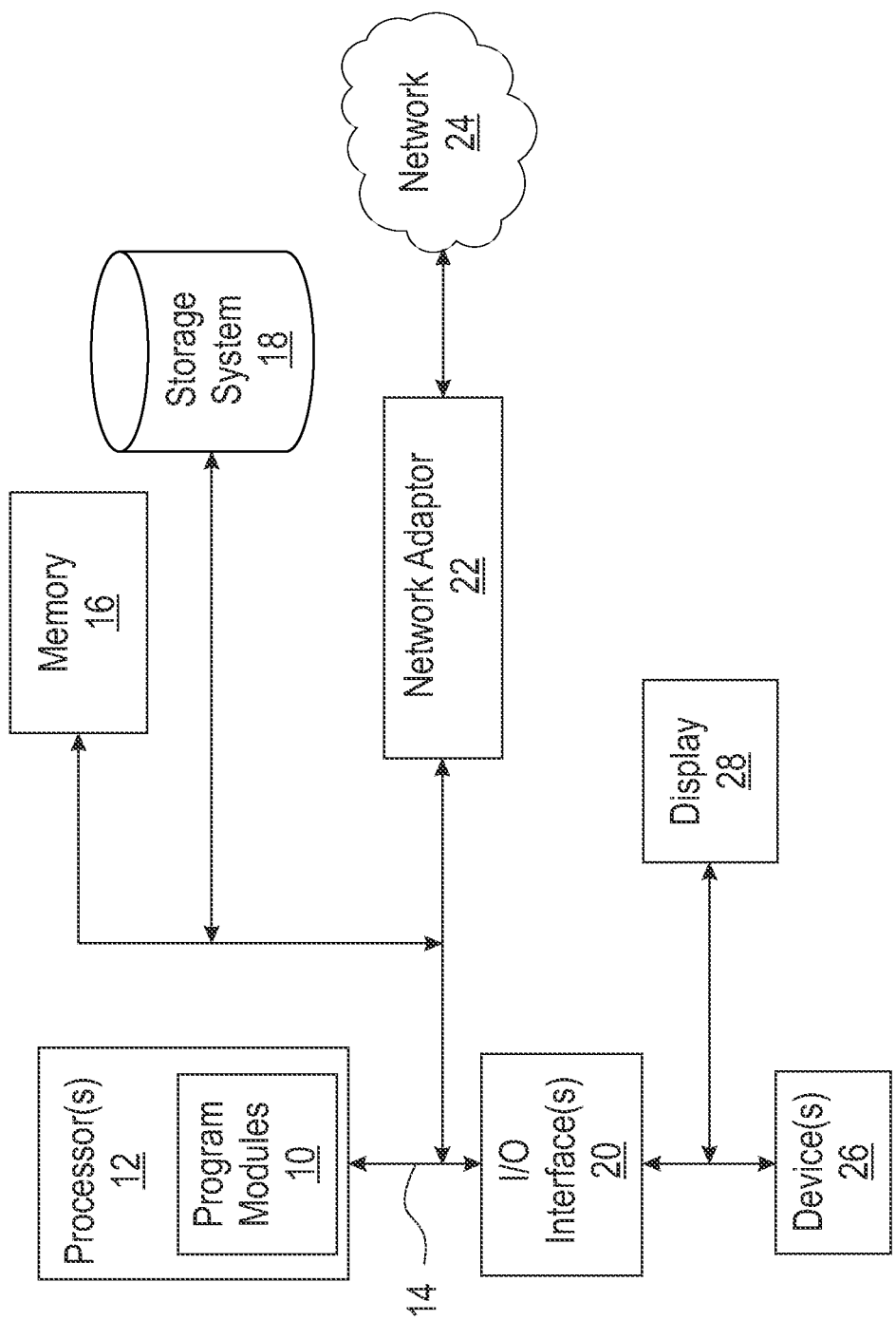
FIG. 10 depicts a computing system that may be used in an embodiment of the present invention.

FIG. 10 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 1 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIGS. 4-7).

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A computer-implemented method for reducing defects of a product being manufactured by a manufacturing apparatus, said computer-implemented method comprising:
receiving, using one or more processor devices, a defect level/range for a quality specification for the output manufactured product based on historical manufacturing data relating a quality of the product in terms of defects in the manufacturing process of prior production lots of the product;
detecting, using one or more sensor devices, occurrence of defects in a product while the product is being manufactured, each defect corresponding to a class of defects;
computing, using the one or more processor devices, a count of said defect occurrences in each defect class for the product being manufactured;
dynamically comparing, using the one or more processor devices, the count of defect occurrences of a class with a target defect count level for that class that meets the quality specification;
upon detecting a count of defect occurrences exceeding a target defect count level for that class of defect, applying, using the one or more processor devices, a heuristic method to predict damages and defect count ranges of respective defect classes for a remainder of the product being manufactured while keeping an initial set of expected defects of a class, said predicted damages and defect count ranges of respective defect classes indicating one or more damage mitigation actions during production to ensure a damage mitigation range of operation while being within a set of constraints to maintain the quality specification for the product; and
controlling, using the one or more processor devices, a device of said manufacturing apparatus to mitigate the damages for remaining product manufacturing steps in response to the determined one or more damages mitigation actions.

2. The method according to claim 1, further comprising:
establishing, using the one or more processors, defect count ranges for each of the defect classes based on prior defect counts for various defect product orders based on the historical manufacturing data of the product.

3. The method according to claim 1, wherein the heuristic method run by said one or more processors dynamically computes a damage mitigation range of operation while being within the overall constraints in a reduced number of cycles, whereby the manufacturing apparatus can operate at a higher velocity for higher quality of the output product.

4. The method according to claim 3, wherein the product is a fabric being manufactured by a fabric weaving apparatus, said method further comprising:
receiving historical defect counts of the finished product (fabric) in different quality categories considering both the yarn defects and the weaving defects, wherein the heuristic method is based on the historical defect counts of the finished fabric in different quality categories.

5. The method according to claim 4, wherein responsive to determining if the defect count exceeds the target defect count level, controlling a sensor-based robotics device to correct or mitigate the defect and enable keeping the fabric product within acceptable defect levels for different product quality levels.

6. The method according to claim 4, further comprising:
dynamically determining, at each defect detection, a defect count or defect severity for different defect classes; and
determining if said defect count or severity determination permits a quality of the fabric product to be maintained under an expected a quality specification for that fabric product.

7. The method according to claim 3, wherein in response to detecting a defect occurrence, using one or more processor devices for dividing and spreading remainder defects among different classes to meet the quality specification for a lot of the product being manufactured.

8. The method according to claim 5, wherein the detecting, using one or more sensor devices, occurrence of defects in the fabric product while the fabric is being manufactured, comprises:
using one or more of:
haptic sensors or visual sensors to dynamically visualize the product or to determine texture of the fabric while being manufactured, said dynamic visualization or texture determination used for one or more of: detecting the quality of a feed yarn to the fabric weaving apparatus, controlling an input quality to the weave or controlling said sensor-based robotic devices to mitigate any yarn defects.

9. The method according to claim 8, wherein the haptic sensors or visual sensors for controlling a robotic mechanism to mitigate one or more defects to maintain a defect spread so that an output product meets the expected quality specification.

10. A system for reducing defects of a product being manufactured by a manufacturing apparatus, said system comprising:
one or more sensor devices configured to detect occurrence of defects in a product while the product is being manufactured, each defect corresponding to a class of defects; and
one or more processors; and a memory coupled to the one or more processors for storing instructions configuring said one or more processors to:
receive a defect level/range for a quality specification for the output manufactured product based on historical manufacturing data relating a quality of the product in terms of defects in the manufacturing process of prior production lots of the product;
compute a count of said defect occurrences in each defect class for the product being manufactured;
dynamically compare a count of defect occurrences of a class with a target defect count level for that class that meets the quality specification;
upon detecting a count of defect occurrences exceeding a target defect count level for that class of defect, apply a heuristic method to predict damages and defect count ranges of respective defect classes for a remainder of the product being manufactured while keeping an initial set of expected defects of a class, said predicted damages and defect count ranges of respective defect classes indicating one or more damage mitigation actions during production to ensure a damage mitigation range of operation while being within a set of constraints to maintain the quality specification for the product; and
control a manufacturing device of said manufacturing apparatus to mitigate the damages for remaining product manufacturing steps in response to the determined one or more damages mitigation actions.

11. The system according to claim 10, wherein said one or more processors are further configured to:
establish defect count ranges for each of the defect classes based on prior defect counts for various defect product orders based on the historical manufacturing data of the product.

12. The system according to claim 10, wherein the heuristic method is run by said one or more processors to configure the one or more processors to:
dynamically compute a damage mitigation range of operation while being within the overall constraints in a reduced number of cycles, whereby the manufacturing apparatus can operate at a higher velocity for higher quality of the output product.

13. The system according to claim 12, wherein the product is a fabric being manufactured by a fabric weaving apparatus, said one or more processors being further configured to:
receive historical defect counts of the finished product (fabric) in different quality categories considering both the yarn defects and the weaving defects, wherein the heuristic method is based on the historical defect counts of the finished fabric in different quality categories.

14. A computer program product for reducing defects of a product being manufactured by a manufacturing apparatus, the computer program product comprising a computer readable storage medium having program instructions embodied therewith, the program instructions executable by a processor to cause the processor to:
receive a defect level/range for a quality specification for the output manufactured product based on historical manufacturing data relating a quality of the product in terms of defects in the manufacturing process of prior production lots of the product;
detect, from one or more sensor devices, occurrence of defects in a product while the product is being manufactured, each defect corresponding to a class of defects;
compute a count of said defect occurrences in each defect class for the product being manufactured;
dynamically compare a count of defect occurrences of a class with a target defect count level for that class that meets the quality specification;
upon detecting a count of defect occurrences exceeding a target defect count level for that class of defect, apply a heuristic method to predict damages and defect count ranges of respective defect classes for a remainder of the product being manufactured while keeping an initial set of expected defects of a class, said determined predicted damages and defect count ranges of respective defect classes indicating one or more damage mitigation actions during production to ensure a damage mitigation range of operation while being within a set of constraints to maintain the quality specification for the product; and
control a manufacturing device of said manufacturing apparatus to mitigate the damages for remaining product manufacturing steps in response to the determined one or more damages mitigation actions.

15. The computer program product according to claim 14, wherein the program instructions further cause the processor to:
establish defect count ranges for each of the defect classes based on prior defect counts for various defect product orders based on the historical manufacturing data of the product.

16. The computer program product according to claim 14, wherein to use the heuristic method, said program instructions further cause the processor to:
dynamically compute a damage mitigation range of operation while being within the overall constraints in a reduced number of cycles, whereby the manufacturing apparatus can operate at a higher velocity for higher quality of the output product.

17. The computer program product according to claim 16, wherein the product is a fabric being manufactured by a fabric weaving apparatus, said program instructions further cause the processor to:
receive historical defect counts of the finished product (fabric) in different quality categories considering both the yarn defects and the weaving defects, wherein the heuristic method is based on the historical defect counts of the finished fabric in different quality categories.

18. The method according to claim 1, wherein the one or more sensor devices detect occurrence of defects in a raw material of a product, said one or more damage mitigation actions during production reducing defects in the raw material.

19. The system according to claim 10, wherein the one or more sensor devices detect occurrence of defects in a raw material of a product, said one or more damage mitigation actions during production reducing defects in the raw material.

20. The computer program product according to claim 14, wherein the one or more sensor devices detect occurrence of defects in a raw material of a product, said one or more damage mitigation actions during production reducing defects in the raw material.

* * * * *